United States Patent [19]

Mehnert et al.

[11] Patent Number: 5,585,132
[45] Date of Patent: Dec. 17, 1996

[54] METHODS AND COMPOSITIONS FOR FAT FREE PROCESS CHEESE

[75] Inventors: David W. Mehnert, Antioch; Steven Prince, Evanston, both of Ill.

[73] Assignee: Kraft Foods, Inc., Northfield, Ill.

[21] Appl. No.: 425,053

[22] Filed: Apr. 19, 1995

[51] Int. Cl.[6] .................................................. A23C 19/08
[52] U.S. Cl. ......................... 426/582; 426/522; 426/611
[58] Field of Search .................................. 426/582, 611, 426/522

[56] References Cited

U.S. PATENT DOCUMENTS

| | | | |
|---|---|---|---|
| 2,604,405 | 7/1952 | Lentz | 250/27 |
| 3,600,186 | 8/1971 | Mattson et al. | 99/1 |
| 4,005,195 | 1/1977 | Jandacek | 424/180 |
| 4,005,196 | 1/1977 | Jandacek et al. | 424/180 |
| 4,020,186 | 4/1977 | Edwards | 426/36 |
| 4,066,800 | 1/1978 | Rosenau et al. | 426/582 |
| 4,075,360 | 2/1978 | Rule et al. | 426/582 |
| 4,684,533 | 8/1987 | Kratochvil | 426/575 |
| 4,748,025 | 5/1988 | Bachmann et al. | 426/43 |
| 4,919,964 | 4/1990 | Adams et al. | 426/564 |
| 5,061,503 | 10/1991 | Kong-Chan et al. | 426/582 |
| 5,061,504 | 10/1991 | Kong-Chan et al. | 426/582 |
| 5,158,796 | 10/1992 | Bernhardt et al. | 426/549 |
| 5,175,013 | 12/1992 | Huang et al. | 426/565 |
| 5,215,778 | 6/1993 | Davison et al. | 426/582 |
| 5,422,131 | 6/1995 | Elsen et al. | 426/531 |

OTHER PUBLICATIONS

The Use Of A Hard Milkfat Fraction In Processed Cheese, M. A. Thomas, vol. 28, No. 2, The Australian Journal of Dairy Technology, Jun., 1973, pp. 77–80.

Kosikowski, F. 1966, Cheese and Fermented Foods, Edwards Brothers, Inc., Ann Arbor, MI, p. 294.

*Primary Examiner*—Helen Pratt
*Attorney, Agent, or Firm*—Debbie K. Wright; Arnold, White & Durkee

[57] ABSTRACT

Process cheese products which are reduced in calories and fat are produced by combining high moisture, fat free, skim milk cheese, with a fatty substance which is non-absorbable non-digestible, and lower in net caloric efficiency than butterfat, animal fat, or vegetable fat. A suitable fatty substance is a polyol polyester, such as, a sucrose polyester.

13 Claims, No Drawings

METHODS AND COMPOSITIONS FOR FAT FREE PROCESS CHEESE

BACKGROUND OF THE INVENTION

Traditional full-fat cheese products which contain butterfat generally contain from about 15% to about 35% fat, from about 50 mg to about 100 mg cholesterol per 100 g, and from about 300 to about 400 calories per 100 g. This is considered unacceptably high fat and calorie content, by many modern consumers who prefer products which have a substantially reduced fat and reduced calorie content and yet which provide the gustatory and physical properties of conventional butterfat-containing full-fat cheese products.

Imitation cheeses are conventionally manufactured from separate edible components such as casein, calcium caseinate, or sodium caseinate, which are obtained from milk as edible food grade materials. Such imitation cheeses are substantially less expensive than natural cheese, and may be prepared with restricted salt content for persons requiring salt-limited diets. Vegetable oils may be used instead of the more saturated animal fat present in conventional cheese, to provide imitation cheese products having a higher unsaturated fat component and also less cholesterol.

Imitation cheese products which replace casein or caseinates with soy, cottonseed or peanut protein, are inexpensive but have an unpleasant flavor and texture. Various combinations of these replacement substances, including gelatin and carrageenan, e.g. as in U.S. Pat. No. 4,684,533, have not produced cheese that is, in the opinion of consumers, comparable in taste, texture, meltability, shredability or sliceability to a full fat product. Filled cheese products have been made wherein the butterfat traditionally present in full-fat cheese was replaced with an alternative, less expensive, animal or vegetable fat. This practice became widespread in the early 1940's when advances in processing technology surfaced in, for example, the areas of homogenization and fluid blending. In almost all cases, the filled cheeses are offered at lower cost than their full fat counterparts, which was probably the most important single factor in the initial acceptance of filled dairy foods. Recently, however, with the public's increased awareness of the dangers of cholesterol found in animal fats, filled cheese products wherein the butterfat is replaced with a vegetable fat have gained increased popularity. The term "animal fats" as used herein encompass the fats derived from dairy, fish, or meat sources.

Imitation cheeses are generally made utilizing as a protein source either aged or non-aged low-fat cheese, vegetable-derived protein such as soy or soy isolate, or commercially available dry-powdered protein derived from fresh, whole or skim milk, buttermilk, cream, or sodium calcium caseinate. A synthetic cheese utilizing skim milk cheese, a type of non-aged low-fat cheese, is described in U.S. Pat. No. 2,604,504. Synthetic cheeses using proteinaceous materials derived from vegetable sources are described in U.S. Pat. No. 4,684,533.

The edible vegetable triglycerides conventionally used in imitation cheese products to simulate the butterfat inherently contained in traditional full-fat cheese are more healthy for human consumption than butterfat or animal fat, particularly because these fats are higher in unsaturates and contain no cholesterol. However, there is no reduction in calories because, gram-for-gram, these two types of fats are of equivalent caloric content.

For consumer acceptance there is a need for the characteristics conferred on full-fat cheese by butterfat and in filled cheese by animal or, preferably, vegetable, fat, to be supplied by a fatty substance which is low-calorie. Use of a non-digestible, or partially digestible, fat substitute lower in net caloric content as compared to regular fat is described in U.S. Pat. Nos. 5,061,503 and 5,061,504.

SUMMARY OF THE INVENTION

Combining polyol polyesters such as sucrose polyester as a fat replacer with high moisture, fat free skim milk cheese, provides a fat-free process cheese of the invention with desirable taste, functionality of texture and melt characteristics which are missing in other fat free process cheese.

The development of high quality fat free process cheese products has been limited because fat replacement systems which impart all of the functionality which butterfat provides to products has not been available until recently. Formulations using fat replacements have not produced process cheeses with characteristics of their full fat counterparts.

Recent developments in the production of high moisture fat free skim milk cheese using natural cheese manufacturing procedures allow the production of process cheese products which are more characteristic of full fat products than those products made from dairy powders. The term "high moisture, fat free skim milk, natural cheese" used herein includes the terms "skim curd," "skim milk cheese," "skim cheese," and "low-fat cheese."

High moisture, fat free, skim milk cheese is an important component of the fat-free processed cheese products of the present invention. The high moisture fat free skim milk cheese may have a moisture content in the range of from about 50 to about 60 weight percent and is prepared from skim milk having a fat content of less than 0.15 weight percent (as is) to provide a skim milk cheese from the skim milk, having less than 1.25, and preferably less than 1.0 weight percent fat. The cheese is cured for at least about 3 weeks, and preferably for a time in the range of from about 3 to about 8 weeks to allow for sufficient breakdown for processing. Prior to blending, the high moisture fat free skim milk cheese is ground to provide a finely comminuted natural cheese product for blending with the other components.

The advantage of skim milk cheese over other sources of dairy protein, particularly dried sodium caseinate and skim milk powder, is that the protein network in skim milk cheese is much more similar to that found in conventional cheese. The similarity of the protein is important to delivering the desired process cheese characteristics.

For the compositions of the present invention, high moisture, fat free skim milk cheese (HMSC) which contains approximately 57% moisture and less than 0.5% –1.5% triglyceride fat is used as a base material which is ground and added to a cooker with a fat replacer such as SPE and other ingredients typical to full fat process cheese.

The invention is directed to a process cheese product made from a high moisture, fat free skim milk cheese and a polyol polyester. Preferably, the polyol polyester is a sucrose polyester. The high moisture skim milk cheese is between 30–75% on an as is basis and the sucrose polyester is about 5 to 35% on an as is basis.

The invention is also directed to a method for the production of a cheese product. The method includes the following steps.

(a) cooking high moisture, fat free skim milk cheese to a temperature at about the melting point of the cheese;

(b) adding emulsifying salts to the cheese heated as in step (a) to form a mixture;

(c) adding polyol polyester to the mixture; and (d) cooking the mixture until the temperature is raised above the melting point of the fat free skim milk cheese.

A preferred polyol polyester is a sucrose polyester.

DESCRIPTION OF THE PREFERRED EMBODIMENT

Combining polyol polyesters such as sucrose polyester as a fat replacer with high moisture, fat free skim milk cheese, provides a fat-free process cheese of the invention with desirable taste, functionality of texture and melt characteristics which are missing in other fat free process cheese. The high moisture fat free skim milk cheese is a natural cheese used as a raw material for this process cheese.

Polyol fatty acid polyesters (PFAP) are the fat substitutes used in compositions of the present invention. U.S. Pat. No. 3,600,186 relates sugar and sugar alcohol fatty acid polyesters as a low calorie replacement for normal triglyceride fat in food products. Methods for preparing sugar and sugar alcohol fatty acid esters and the composition of such esters are disclosed in U.S. Pat. Nos. 4,919,964, and 5,158,796, for example. In an attempt to avoid problems associated with the ester, U.S. Pat. No. 4,005,195 and U.S. Pat. No. 4,005,196 disclose a method of adding anti-anal leakage agents to the liquid polyesters. The polyol fatty acid polyesters used in the present invention do not induce anal leakage.

Sucrose polyester (SPE) is a preferred fat substitute. Forms of SPE that are suitable for use in the present invention are shown in Table 1. SPE types shown are derived from cottonseed oil or soybean oil, although other sources are also suitable. Mouthcoating is correlated with the percent solids at body temperature. Therefore, a suitable source of SPE is likely to be one that has a relatively low percent solids at body temperature, e.g., CSOI is preferred to SBO III.

TABLE 1

Percent Solids at Given Temperature

| Temp. (°F.) | SPE Type | | | |
|---|---|---|---|---|
| | SBO I | SBO II | CSO I | SBO III |
| 50 | 59 | 57.7 | 6.4 | 11.6 |
| 70 | 45.7 | 47.5 | 3.3 | 8.3 |
| 80 | 36.4 | 39.2 | 2.8 | 6.9 |
| 92 | 18.3 | 19.8 | 1.7 | 5.9 |
| 100 | 8.6 | 8.3 | 1.3 | 6 |
| 105 | ? | 0 | ? | ? |
| 140.3 | 0 | | ? | ? |
| 143.8 | | | ? | 0 |
| 145 | | | 0 | |

Note that zero percent solids indicates complete melt point; this is not a desirable property at body temperature because it is likely to increase anal leakage CSO=SPE made from fatty acids derived from cottonseed oil.

SBO=SPE made from fatty acids derived from soybean oil.

A form of SPE (Olestra®) is a PFAP which has been proposed for many food preparations. SPE is a non-digestible non-absorbable, fat-like material consisting of hexa-, hepta- and octa-esters of sucrose and fatty acids. There must be at least 4 fatty acid ester groups present on each polyol molecule because those compounds with 3 or fewer groups are digestible. The fatty acids used may have between 8 and 22 carbon atoms but those with 14 to 18 carbons are preferred. Sugars other than sucrose may be used to make polyol fatty acid esters that are non-digestible. They include monosaccharides with at least 4 hydroxy groups, disaccharides and trisaccharides. Thus erythritol, xylitol, sorbitol, glucose and sucrose can be used for the polyol moiety. SPE is preferably synthesized by a solvent-free interesterification reaction or by direct esterification using acid chlorides or anhydrides. The physical properties of SPE depend primarily on the fatty acids used in its preparation. For example, SPE made from unsaturated fatty acids, such as those from safflower oil, or from short-chain fatty acids are free-flowing liquids at room temperature. On the other hand, those made from saturated or long-chain fatty acids, such as tallow, are usually solid at room temperature. High moisture fat free skim milk cheese is prepared by methods described in U.S. Pat. No. 5,215,778, col. 9 line 39 through col. 10 line 6.

EXAMPLE 1

Low Calorie Process Cheese Loaf Containing Sucrose Fatty Acid Polyester

A cheese loaf was made according to the formulation in Table 2

TABLE 2

A Formulation for a Cheese Loaf.

| High moisture fat free skim milk cheese | 37.0% |
|---|---|
| Water | 25.24 |
| Dried skim milk powder | 21.54 |
| Sucrose fatty acid polyester | 10.0 |
| Emulsifier | 4.0 |
| Salt (NaCl) | 1.5 |
| Lactic acid (88% soln.) | 0.3 |
| Sorbic acid | 0.2 |
| Cheese flavor | 0.12 |
| Annatto (color) | 0.1 |
| Total | 100% |

To make the cheese loaf, a "wet mix" was prepared by incorporating all the ingredients in Table 2 except the high moisture fat free skim milk cheese and the sucrose fatty acid polyester. In particular, the water was weighed into a container and agitated using a high shear mixer. The lactic acid and annatto were added to the mixer, and then the preblended dried skim milk powder, salts, and flavor were slowly added. Agitation was continued for 1 minute after all ingredients had been added. At four weeks after aging the products, an expert panel of five cheese graders evaluated samples in a blind fashion, comparing experimental to control cheeses: fat free, fat reduced 50%, to full fat controls. The characteristics of the experimental products fall within the range of 50% reduced fat and the comparable full fat product.

In the next step, "wet mix" described above and the high moisture, fat free skim curd of Table 2 were added to the cooker. Agitation and steam injection was initiated and continued until a temperature of about 160° F. was reached. After reaching this temperature, the steam injection and agitation were turned off and the sucrose fatty acid polyester, which was pre-heated to about 145° F., was added. Steam injection and agitation resumed until about 185° F. was reached. 185° F. was maintained with occasional steam injection for 3 minutes. The molten product was packaged in 8 ounce loaf containers. The resulting product has the appearance, taste and texture comparable to that of products such as Velveeta process loaf.

EXAMPLE 2

Low Calorie Process Cheese Singles Containing Sucrose Fatty Acid Polyester

Two formulations for making a process cheese single are shown in Tables 3 and 4.

TABLE 3

A Formulation for a Process Cheese Single.

| | |
|---|---|
| High moisture fat free skim milk cheese | 75.1 |
| Sucrose fatty acid polyester | 15 |
| Water | 2.136 |
| Emulsifier | 2.5 |
| Salt (NaCl) | 1.5 |
| Dried skim milk powder | .68 |
| Dried sweet whey powder | .68 |
| Flavors | 1.75 |
| Sorbic Acid | .2 |
| Color | 0.54 |
| Lactic Acid | 0.5 |
| Total | 100% |

TABLE 4

A Formulation for a Process Cheese Single.

| | |
|---|---|
| High moisture fat free skim milk cheese | 50.0% |
| Water | 12.396 |
| Dried skim milk powder | 6.35 |
| Dried sweet whey powder | 6.35 |
| Sucrose fatty acid polyester | 12.5 |
| Emulsifier | 4.0 |
| Salt (NaCl) | 1.5 |
| Lactic acid (88% soln.) | 0.4 |
| Sorbic acid | 0.2 |
| Cheese flavor | 1.25 |
| Annatto | 0.03 |
| Beta carotene | 0.024 |
| Total | 100% |

To prepare process cheese singles, water was weighed into a container and agitated using a whisk style mixer. Preblend dried skim milk and whey powders were slowly added to the mixer to form a "wet mix". Agitation was continued for about 1 minute after all ingredients were added.

The wet mix, high moisture fat free skim milk cheese, salts and sorbic and lactic acids were all subsequently added to the cooker. Steam injection and agitation was initiated and continued until a temperature of about 160° F. was reached. The agitator and steam injection were stopped and the sucrose fatty acid polyester, colors and flavors were added. Steam injection and agitation resumed until a temperature of 170° F. was reached. The product was maintained at 170° F. with intermittent steam injection and agitation until the completed cooking time of about 10 minutes was reached.

The molten product was formed, cooled and packaged using hot fill equipment known to those of skill in the art into individually wrapped singles. The process is described in U.S. Pat. No. 5,215,778. The resulting product at four weeks of age had the characteristic mouth-feel, taste and melt characteristics of conventional individually wrapped process cheese singles. At four weeks after aging the products, an expert panel of five cheese graders evaluated samples in a blind fashion comparing experimental to control: fat free, reduced fat 50% to full fat controls. The characteristics of the experimental product fall within the range of 50% reduced fat and the comparable full fat product.

TABLE 5

Ranges of Ingredients Suitable for Preparation of Process Cheese Singles.

| | |
|---|---|
| High moisture fat free skim milk cheese | 35–75.0% preferably 50–55% |
| Water | 2–33% preferably 10–15% |
| Dried skim milk powder | 2–22% preferably 5–10% |
| Dried sweet whey powder | 5–20% preferably 5–10% |
| Sucrose fatty acid polyester | 5–35% preferably 20–23% |
| Emulsifier | 1.5–4% preferably 2.5% |
| Sodium citrate | 0–2.5% preferably 0% |
| Salt (NaCl) | 1–1.6% preferably 1.5% |
| Lactic acid (88% soln.) | 0.4% |
| Sorbic acid | 0.2% |
| Cheese flavor | 0–3% preferably 0.5–2% |
| Annatto | 0.024% |
| Beta carotene | 0.024% |

Ranges of the percentages of ingredients suitable to prepare process cheese singles of the present invention, are shown in Table 5.

EXAMPLE 3

Low Calorie Process Cheese Sauce Containing Sucrose Fatty Acid Polyester

The process for preparing a cheese sauce is identical to the process for preparing a cheese loaf according to Example 1. A difference is that the final product goes into a jar instead of a loaf container. A formulation is shown in Table 6.

TABLE 6

A Formulation for a Process Cheese Sauce.

| | |
|---|---|
| High moisture fat free skim milk cheese | 35.1 |
| Water | 27.24 |
| Dried skim milk powder | 21.54 |
| Sucrose fatty acid polyester | 10.0 |
| Emulsifier | 2.5 |
| Salt | 1.5 |
| Lactic Acid | 0.3 |
| Sorbic Acid | 0.2 |
| Cheese flavor | 1.62 |
| Annatto | 0.1 |
| Total | 100 |

What is claimed is:

1. A process cheese product comprising:

(a) high moisture, fat free skim milk cheese; and (b) polyol polyester, wherein said process cheese product is essentially fat free.

2. The process cheese product of claim 1, wherein the polyol polyester is a sucrose polyester.

3. The process cheese product of claim 2, wherein the high moisture skim milk cheese is between 15–33% on a dry weight basis and the sucrose polyester is about 5 to 35% (as is basis).

4. The method of claim 1, wherein the process cheese product is a cheese loaf.

5. The method of claim 1, wherein the process cheese product is a cheese single.

6. The process of claim 1, wherein the process cheese product is a cheese sauce.

7. A method for the production of a cheese product, said method comprising:
   (a) cooking high moisture, fat free skim milk cheese to a temperature at about the melting point of the cheese;
   (b) adding emulsifying salts to the heated cheese as in step (a) to form a mixture;
   (c) adding polyol polyester to the mixture; and
   (d) cooking the mixture until the temperature is raised above the melting point of the fat free skim cheese,
wherein said cheese product is essentially fat free.

8. The method of claim 7, wherein the polyol polyester is a sucrose polyester.

9. A process cheese comprising:
   about 37% high moisture fat free skim milk cheese,
   about 25% water,
   about 21% dried skim milk powder,
   about 10% sucrose fatty acid polyester,
   about 4% di sodium phosphate,
   about 1.5% salt (NaCl),
   about 0.3% of an 88% lactic acid solution
   about 0.2% sorbic acid,
   about 0.12% cheese flavor,
   about 0.1% annatto.

10. A process cheese comprising:
    from 35–75% high moisture fat free skim milk cheese,
    from 2–33% water,
    from 2–22% dried skim milk powder,
    from 5–20% dried sweet whey powder,
    from 10–25% sucrose fatty acid polyester,
    from 1.5 4% di sodium phosphate,
    from 0–25% sodium citrate,
    from 1–1.6% salt (NaCl),
    from 0.4% of an 88% lactic acid solution,
    from 0.2% sorbic acid,
    from 0–3% cheese flavor,
    from 0.024% annatto, and
    from 0.024% beta carotene.

11. A process cheese comprising:
    from 50–55% high moisture fat free skim milk cheese,
    from 10–15% water,
    from 5–10% dried skim milk powder,
    from 5–20% dried sweet whey powder,
    from 20–23% sucrose fatty acid polyester,
    about 2.5% di sodium phosphate,
    about 0%–2.5% sodium citrate,
    about 1.5% salt (NaCl),
    about 0.4% of an 88% lactic acid solution,
    about 0.2% sorbic acid,
    about 0.5–2% cheese flavor,
    about 0.024% annatto (color), and
    about 0.024% Beta carotene (color).

12. A process cheese comprising:
    about 50% high moisture fat free skim milk cheese,
    about 12% water,
    about 6% dried skim milk powder,
    about 6% dried sweet whey powder,
    about 12% sucrose fatty acid polyester,
    about 4% di sodium phosphate,
    about 1.5% salt (NaCl),
    about 0.4% of an 88% lactic acid solution,
    about 0.2% sorbic acid,
    about 0.3% cheese flavor,
    about 0.3% annatto, and
    about 0.2% beta carotene.

13. A process cheese comprising:
    about 35.1% high moisture skim fat free skim milk cheese,
    about 27.24% water,
    about 21.54% dried skim milk powder,
    about 10.0% sucrose fatty acid polyester,
    about 2.5% emulsifier,
    about 1.5% salt,
    about 0.3% of an 88% lactic acid solution,
    about 0.2% sorbic acid,
    about 1.62% cheese flavor, and
    about 0.1% annatto.

* * * * *